United States Patent
Sharma et al.

(10) Patent No.: US 10,572,751 B2
(45) Date of Patent: Feb. 25, 2020

(54) CONVERSION OF MECHANICAL MARKINGS ON A HARDCOPY DOCUMENT INTO MACHINE-ENCODED ANNOTATIONS

(71) Applicant: Adobe Inc., San Jose, CA (US)

(72) Inventors: Vijay Kumar Sharma, Delhi (IN); Sourabh Gupta, Uttar Pradesh (IN); Ajay Bedi, Himachal Pradesh (IN)

(73) Assignee: ADOBE INC., San Jose, CA (US)

( * ) Notice: Subject to any disclaimer, the term of this patent is extended or adjusted under 35 U.S.C. 154(b) by 157 days.

(21) Appl. No.: 15/446,136

(22) Filed: Mar. 1, 2017

(65) Prior Publication Data
US 2018/0253620 A1    Sep. 6, 2018

(51) Int. Cl.
| | |
|---|---|
| *G06K 9/46* | (2006.01) |
| *H04N 1/417* | (2006.01) |
| *H04N 1/415* | (2006.01) |
| *H04N 1/58* | (2006.01) |
| *G06K 9/00* | (2006.01) |
| *G06K 9/20* | (2006.01) |
| *H04N 1/62* | (2006.01) |

(52) U.S. Cl.
CPC ....... *G06K 9/2063* (2013.01); *G06K 9/00463* (2013.01); *H04N 1/415* (2013.01); *H04N 1/4177* (2013.01); *H04N 1/58* (2013.01); *H04N 1/626* (2013.01); *G06K 2209/01* (2013.01); *H04N 2201/0081* (2013.01)

(58) Field of Classification Search
CPC .......... G06K 2209/01; G06K 9/00463; G06K 9/2063; G06K 9/4633; G06K 9/4652; H04N 1/415; H04N 1/4177; H04N 1/58; H04N 2201/0081
See application file for complete search history.

(56) References Cited

U.S. PATENT DOCUMENTS

| | | | | |
|---|---|---|---|---|
| 8,009,928 B1* | 8/2011 | Manmatha | ............. | G06K 9/325 382/173 |
| 9,286,541 B1* | 3/2016 | Natarajan | ............ | G06K 9/4642 |
| 2006/0045386 A1* | 3/2006 | Fukuoka | .............. | G06K 9/2054 382/305 |
| 2006/0291015 A1* | 12/2006 | Yeoh | ........................ | H04N 1/38 358/518 |
| 2006/0291727 A1* | 12/2006 | Bargeron | ........... | G06K 9/00442 382/218 |

(Continued)

*Primary Examiner* — Kim Y Vu
*Assistant Examiner* — Michael J Vanchy, Jr.
(74) *Attorney, Agent, or Firm* — Finch & Maloney PLLC

(57) ABSTRACT

Techniques for converting mechanical markings on hardcopy textual content into digital annotations in a digital document file. In accordance with some embodiments, the techniques include identifying at least one block of text in a digital (scanned) image of a hardcopy document, and identifying at least one mechanical marking in the digital image of the hardcopy document. The mechanical marking, such as an underline, strike-through, highlight or circle, covers or lies adjacent to the corresponding block of text. An annotated digital document file is generated from the digital image of the hardcopy document. The annotated digital document file includes computer-executable instructions representing the original text of the hardcopy document and at least one annotation corresponding to the mechanical marking in the hardcopy document.

20 Claims, 10 Drawing Sheets

(56) References Cited

U.S. PATENT DOCUMENTS

| | | | |
|---|---|---|---|
| 2008/0114782 A1* | 5/2008 | Sadovsky | G06F 16/94 |
| 2008/0195931 A1* | 8/2008 | Raghupathy | G06K 9/00402 |
| | | | 715/230 |
| 2013/0201334 A1* | 8/2013 | C | G06K 9/00818 |
| | | | 348/148 |
| 2014/0245123 A1* | 8/2014 | Pircher | G06F 17/241 |
| | | | 715/232 |
| 2016/0259971 A1* | 9/2016 | Kim | G06K 9/00442 |
| 2017/0293217 A1* | 10/2017 | Gallager | G03B 41/00 |

* cited by examiner

CONVERSION OF MECHANICAL MARKINGS ON A HARDCOPY DOCUMENT INTO MACHINE-ENCODED ANNOTATIONS

FIELD OF THE DISCLOSURE

This disclosure relates generally to digital media processing, and more particularly, to techniques for converting mechanical markings on a hardcopy document into machine-encoded annotations of an electronic document.

BACKGROUND

Readers of hardcopy documents, such as books, magazines and newspapers, commonly make handwritten marks to highlight, underline, strike-through and circle text, along with other mechanical markings. Such mechanical markings may, for example, indicate important text that the reader may wish to revisit at a later time or share with another person. Some people spend a considerable amount of time and effort in marking-up important text. For instance, in the publishing industry, a common practice for editors is to use hard copies for correcting mistakes, highlighting areas to be edited or annotating paragraphs for layout. After the editing or other annotation process, the marked up hardcopy can be converted into digital form, such as by scanning or otherwise imaging the marked up hardcopy. However, when the hardcopy is scanned and converted to, for example, Portable Document Format (PDF) using existing techniques (e.g., optical character recognition or other process of generating digital text), the mechanical markings are not retained in the digital version of the document. The loss of the markings can represent a significant loss of information.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
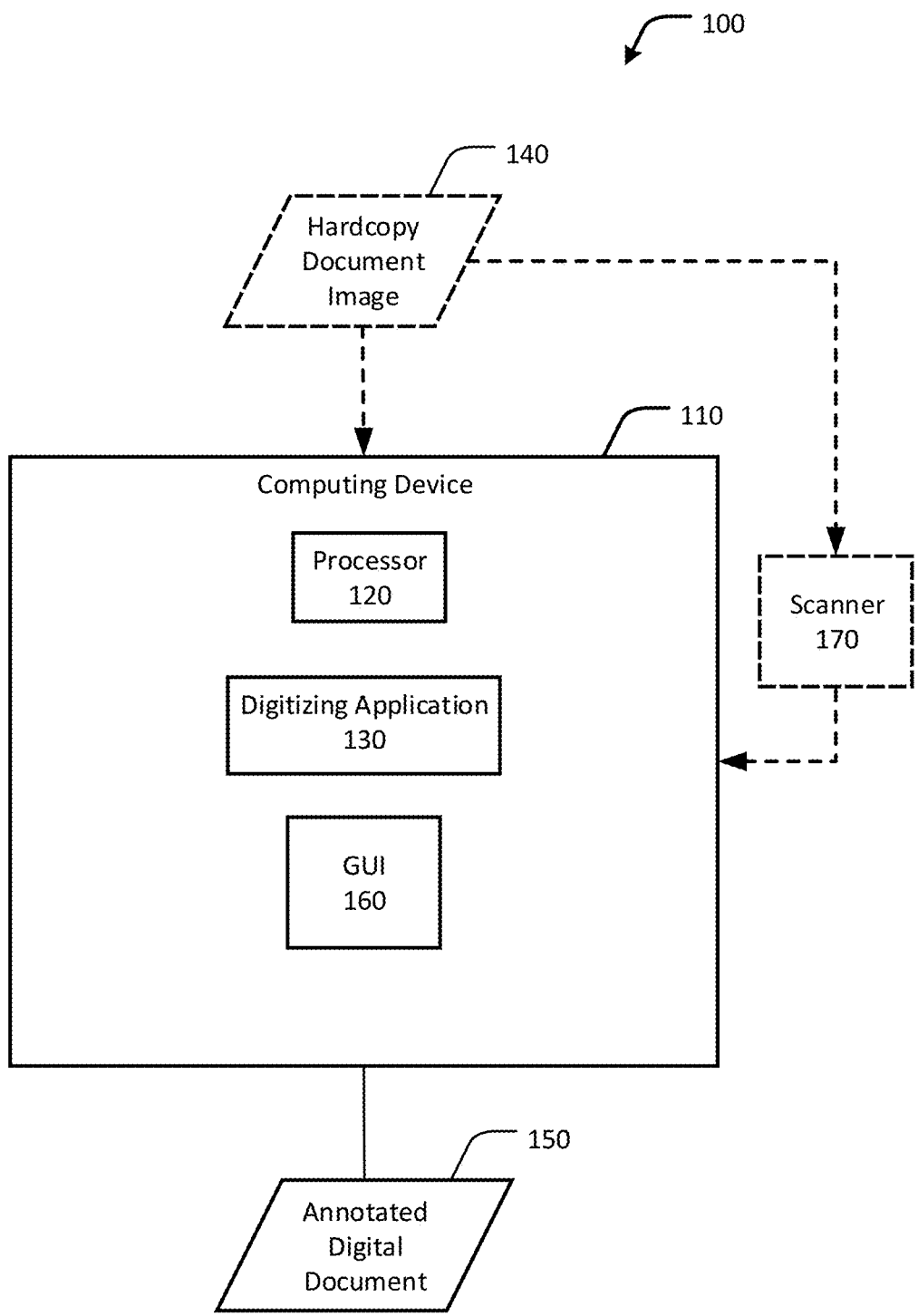
FIG. 1 shows an example system for converting mechanical markings on hardcopy textual content to machine-encoded annotations in a digital document file, in accordance with an embodiment of the present disclosure.

Techniques are disclosed for converting mechanical (e.g., handwritten) markings on hardcopy documents into machine-encoded annotations in a digital document. The disclosed techniques are particularly useful in situations where hardcopy documents containing text and mechanical markings are digitally scanned and converted into an electronic form, and where a user wishes to preserve the mechanical markings as machine-encoded annotations to the text. For instance, it is increasingly common for users to convert physical content (e.g., books, newspapers, magazines, or other reading materials) into digital form. Often, the physical content includes not only text but also useful information added by the reader, such as markings of important content including highlights, underlines, strike-through marks, and circles covering or near the text. Although it is useful to convert the text on the hardcopy into an electronic form, such as Portable Document Format (PDF) or another suitable electronic document file format that user can edit, it is also useful to convert the mechanical markings into machine-encoded annotations of the document file without loss of that information. The machine-encoded annotations can include, for instance, encircled text, colored or highlighted text, underlined text, and strikethrough text. Note that the machine-encoded annotations in the resulting digital file can but may not necessarily look exactly like the mechanical annotations of the hardcopy. For instance, traits typical of human-generated mechanical annotation (e.g., such as curvy/wavy lines and highlighting, and irregular rounded corners) may be replaced with traits typical of machine-generated annotations (e.g., such as straight lines and highlighting, and uniform rounded corners or right-angled corners).

To this end, techniques are provided for converting mechanical markings on hardcopy textual content into machine-encoded annotations in a digital document file. In accordance with an embodiment, the hardcopy textual content having the mechanical markings or annotations is first scanned or otherwise imaged to provide a digital image of the hardcopy document. Although the processing may be implemented in a number of ways, some embodiments include identifying at least one block of text in a digital (scanned) image of a hardcopy document, and identifying at least one mechanical marking in the digital image of the hardcopy document. The mechanical marking, such as an underline, strike-through, highlight or circle, covers or lies adjacent to the corresponding block of text. A digital document file is generated from the digital image of the hardcopy document. The digital document file includes at least one machine-encoded annotation corresponding to the mechanical marking in the digital image of the hardcopy document. In this manner, no information is lost from the original, physical document, and the markings are preserved in the digital copy of the document. Numerous configurations and variations will be apparent in light of this disclosure.

The term "annotation," in addition to its plain and ordinary meaning, refers to an association between an object (e.g., a mark representing an underline, a color/highlight, or a line covering or adjacent to text) with a location on a page of a document. A mechanical annotation may be used to generally refer to an annotation applied to a hardcopy document, while a digital annotation may be used to generally refer to an annotation applied to a digital document file. Note that an annotation may initially be an imaged annotation (e.g., bitmap or JPEG or other such image resulting from conversion of the hardcopy to the digital domain) and subsequently converted to a machine-encoded annotation (e.g., PDF, ASCII or other code-based annotation suitable for use by a computer or other machine). An annotation provides a further way for a user to interact with the digital document, for example, via a mouse and keyboard. For example, a user can modify or extend the annotations by removing or extending an underline annotation from some of the lines which were previously underlined or highlighted using a keyboard or mouse. Similarly, using a keyboard or mouse, the user can extend a strike-through annotation into adjacent text or adjoining lines of text. In the context of a PDF document, the PDF specification (e.g., Version 1.7 of the Adobe® Portable Document Format, November 2006; ISO 32000-1) further defines annotation, as the term is variously used in this disclosure, and computer-executable instructions for processing and displaying the annotation.

System Architecture

FIG. 1 shows an example system 100 for converting mechanical markings on hardcopy textual content into machine-encoded annotations, in accordance with an embodiment of the present disclosure. The system 100 includes a computing device 110 having a processor 120, a digitizing application 130, and a graphical user interface (GUI) 160. In some embodiments, the system 100 includes a scanner 170. In some embodiments, the system 100 is configured to receive a hardcopy document image 140, either via the scanner 170 or by other means (e.g., from another source via a communications network or other electronic interface, such as via e-mail, an Internet/web resource, or file serving). The hardcopy document image 140 may, for example, include textual content that has mechanical markings and annotations, such as underlined text, colored/highlighted text, encircled text and strike-through text, such as described with respect to FIG. 2. The system 100 is further configured to generate an annotated digital document 150, which can include machine-encoded annotations that replicate or approximate one or more of the mechanical markings and annotations in the hardcopy document image 140.

Example Hardcopy Document Image

Figure 2:
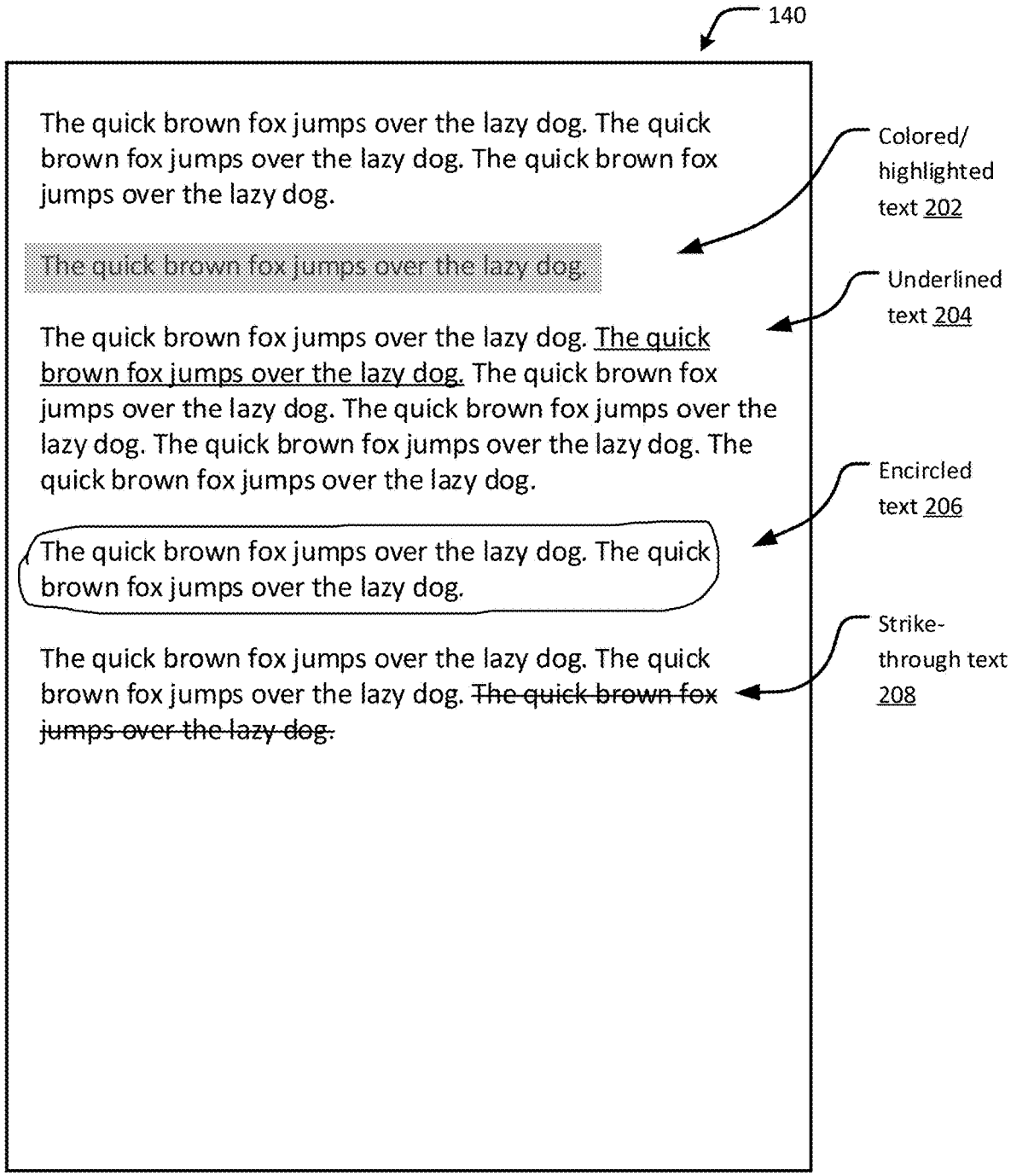
FIG. 2 is an image of an example annotated hardcopy document in accordance with an embodiment of the present disclosure.

FIG. 2 is an example hardcopy document image 140 in accordance with an embodiment of the present disclosure. The hardcopy document image 140 is a digital representation of a physical, hardcopy document that has been converted into an electronic facsimile of the original. The hardcopy document image 140 may, for example, be a photorealistic replica of the original hardcopy document, including all of the mechanically printed content on the hardcopy. For example, as can be seen in FIG. 2, several lines of text appear in the hardcopy document image 140. Some of the text blocks are not mechanically marked, while some of the text blocks have mechanical markings that cover or lie adjacent to the text. The mechanical markings may include, for example, colored or highlighted text 202, such as can be produced by drawing on the original hardcopy document with a highlighting pen. The mechanical markings may additionally or alternatively include underlined text 204, encircled text 206 and strike-through text 208. The hardcopy document image 140 may be stored in any number of suitable formats, such as .GIF (Graphical Interchange Format), .JPG (Joint Photographic Experts Group), .BMP (bitmap), and .PDF (Portable Document Format), among others, where text, markings and other annotations are represented as pixels in the hardcopy document image 140. As will be described in further detail below, the digitizing application 130 is configured to identify and locate text and mechanical markings in the hardcopy document image 140 and generate the machine-encoded annotated digital document 150, which is a PDF-compliant representation of the text and mechanical markings.

Example Methodologies

Figure 3:
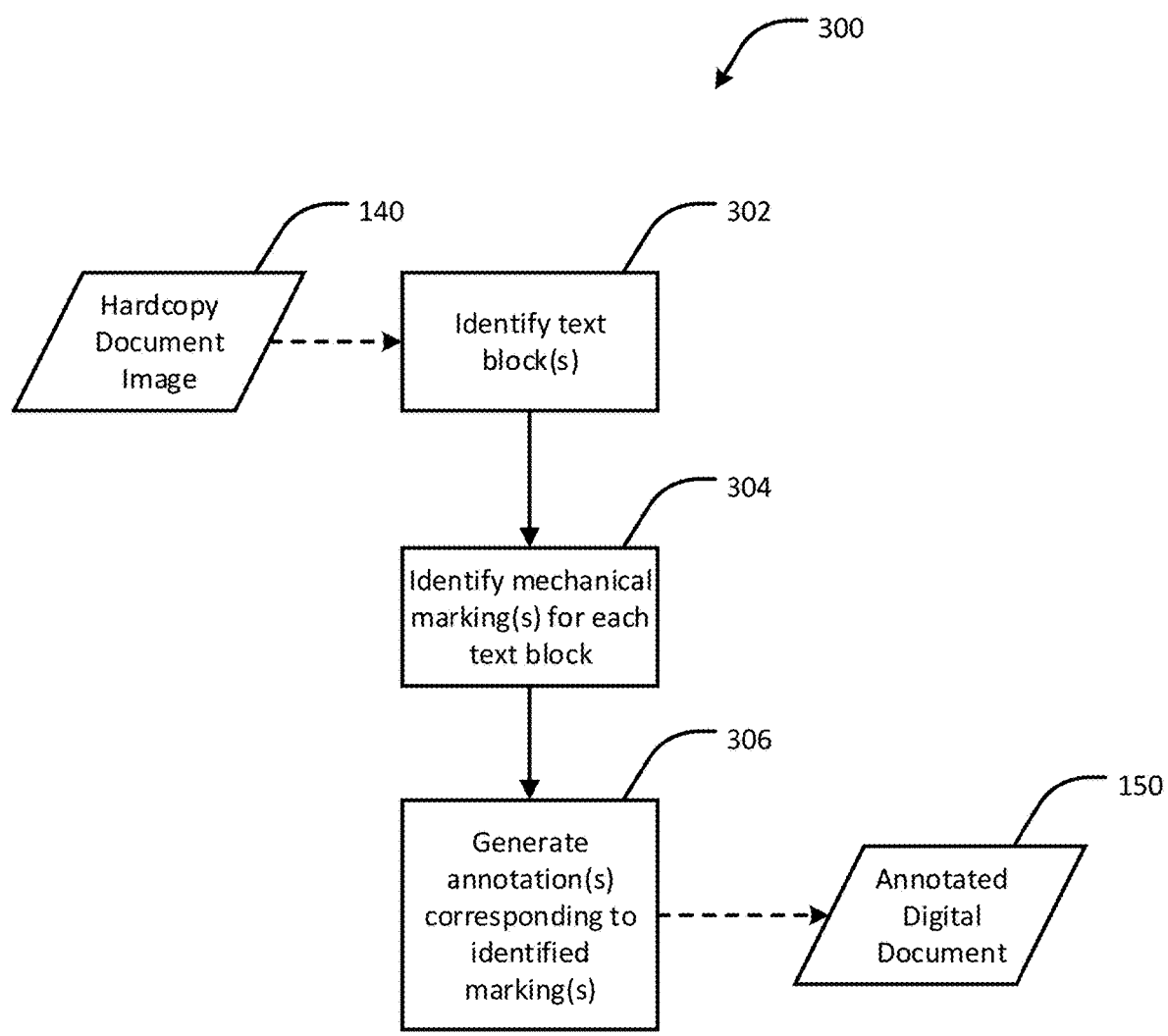
FIG. 3 is a flow diagram of an example methodology for converting mechanical markings on hardcopy textual content to machine-encoded annotations in a digital document file, in accordance with an embodiment of the present disclosure.

FIG. 3 is a flow diagram of an example methodology 300 for converting mechanical markings on a hardcopy document into machine-encoded annotations, in accordance with an embodiment of the present disclosure. The methodology 300 may, for example, be implemented in the digitizing application 130 of FIG. 1. In general, the methodology 300 is configured to identify and locate mechanical markings, such as underlined text, colored/highlighted text, encircled text and strike-through text, appearing in the hardcopy document image 140, and to generate the annotated digital document 150, which contains annotations corresponding to one or more of the mechanical markings in the hardcopy document image 140. The hardcopy document image 140 may be obtained in any number of ways, such as by scanning the original hardcopy document containing the mechanical markings using the scanner 170 of FIG. 1. Such scanning generates the hardcopy document image 140, which is an electronic facsimile of the original hardcopy document that is processed using the methodology 300.

The methodology 300 begins by identifying 302 one or more blocks of text (also referred to as text blocks) in the hardcopy document image 140. Each text block includes at least a contiguous portion of one or more horizontal lines of text in the hardcopy document image 140. For example, referring to FIG. 2, the first line of text including "The quick brown fox jumps over the lazy dog" may form one text block. In general, identifying 302 the text blocks in the hardcopy document image 140 localizes the text for identifying the mechanical markings (e.g., underline, color/highlight, encircle and strike-through) corresponding to that particular text block. Any number of suitable techniques may be used to identify 302 a text block, including adaptive thresholding and morphological image processing techniques, such as described with respect to FIG. 4.

The methodology 300 continues by identifying 304 one or more mechanical markings associated with each identified text block. For example, a given text block may have text that is underlined, colored/highlighted, encircled, stricken-through, or any combination of such markings. One or more techniques can be used to identify each type of mechanical marking, including performing a Probabilistic Hough transformation on at least a portion the hardcopy document image 140 containing the identified text block, such as described with respect to FIGS. 5-9.

The methodology 300 continues by generating 306 one or more machine-encoded annotations corresponding to the markings identified in step 304. The machine-encoded annotations correspond to the mechanical markings identified in each text block (e.g., underline, color/highlight, circle, strike-through, or any combination of these). In some embodiments, the machine-encoded annotations are compliant with a PDF standard (e.g., Version 1.7). The machine-encoded annotations can be included in the annotated digital document 150 such that a suitable application can render the machine-encoded annotations along with the underlying textual content of the document in the GUI 160. After this, the user can view and modify the machine-encoded annotations within the document.

Figure 4:
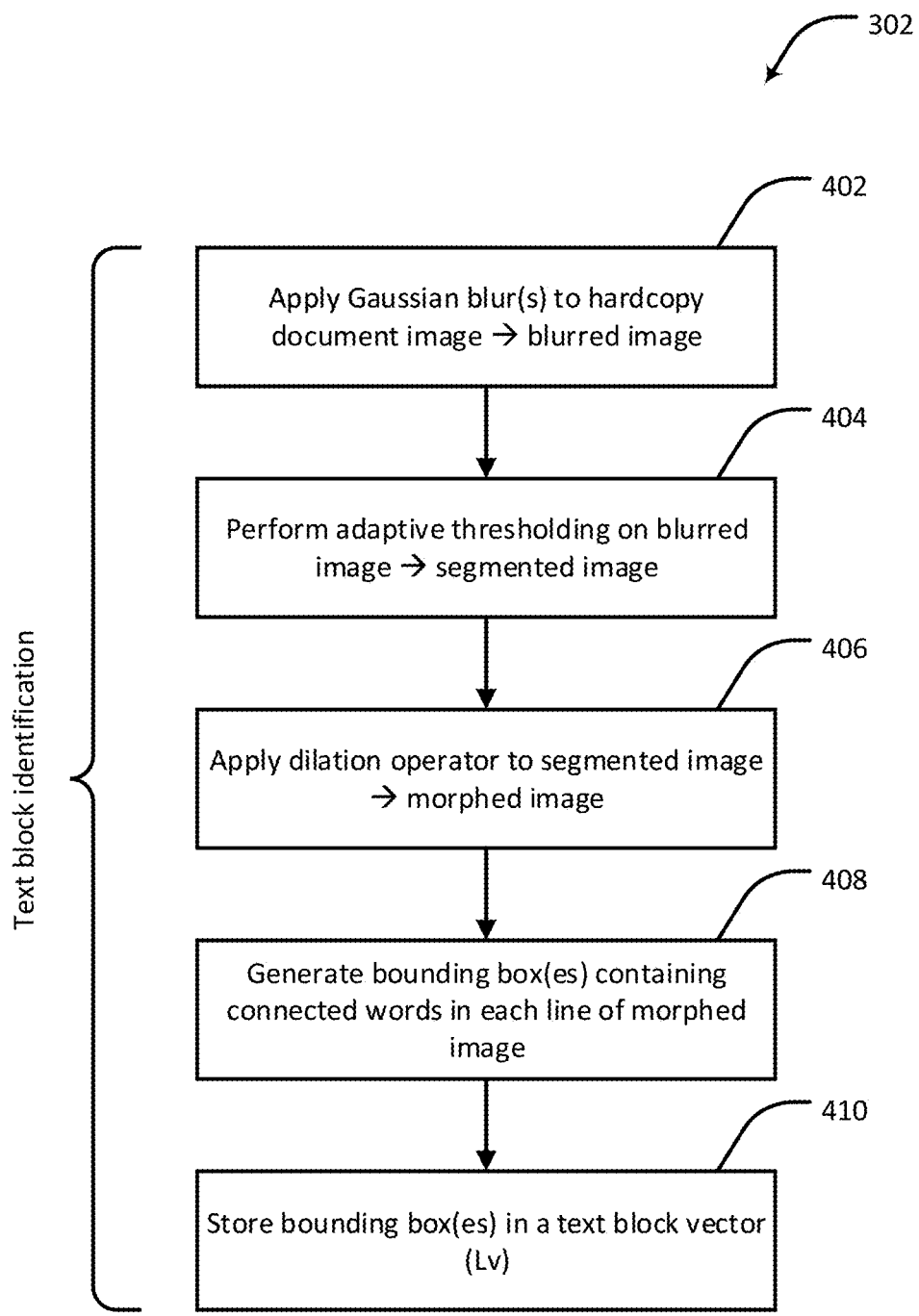
FIG. 4 is a flow diagram of an example methodology for identifying blocks of text in an image of a hardcopy document, in accordance with an embodiment of the present disclosure.

FIG. 4 is a flow diagram of an example methodology 302 for identifying text blocks, in accordance with an embodiment of the present disclosure. The methodology 302 includes performing 402 one or more Gaussian blurs on the hardcopy document image 140 to produce a blurred image. The Gaussian blurs reduce the noise levels in the hardcopy document image 140 and can be used with edge detection, such as described with respect to FIG. 6 for identifying underlined text. In image processing, a Gaussian blur or smoothing operation is the application of a Gaussian function on the image by convolution, which modifies the structure of the image by attenuating noise, including high frequency components, and reducing image detail while enhancing the structure at various scales, similar to the effect of a low pass filter.

The methodology 302 continues by performing 404 adaptive thresholding to the blurred image to produce a segmented (e.g., grayscale) image. Thresholding is a technique for segmenting the blurred image by setting all pixels whose intensity values are above a given threshold to a foreground value, and setting all the remaining pixels to a background value, thereby segmenting the image into binary sets of foreground and background pixels based on the respective pixel intensities. Adaptive thresholding further changes the threshold value dynamically over the image. The effect of adaptive thresholding is to separate the text and mechanical markings in the hardcopy document image 140 from the background of the document by selecting a threshold for each pixel based on a range of intensity values in the local neighborhood (e.g., a region surrounding each of the text blocks). Adaptive thresholding is particularly useful for document images that have strong illumination gradients (e.g., lighter at the top of the page than at the bottom of the page).

The methodology 302 continues by applying 406 a dilation operator to the segmented image one or more times to produce a morphed image, where each text character forms a so-called connected component. Dilation is the process of enlarging the boundaries of regions of foreground pixels (e.g., the pixels representing text). The dilation operator takes as inputs the image which is to be dilated (e.g., the hardcopy document image 140) and a set of coordinate points known as a structuring element (or kernel), which defines the dilation effect on the input image. The dilation operator is applied in the horizontal direction so that vertical lines are not connected with each other. An example dilation structuring element that can be used in conjunction with an embodiment is:

$$C = \begin{bmatrix} 0 & 1 & 0 \\ 1 & 1 & 1 \\ 0 & 1 & 0 \end{bmatrix}$$

After dilation has been performed, the methodology 302 continues by generating 408 one or more bounding boxes surrounding one or more words in a block of text. The bounding box includes a region of pixels around and including a line of text or a portion of such text. The bounding box is used to identify any mechanical markings near or covering the text. Lines that are relatively small in height (h<T) may be ignored, where T is the threshold for defining the maximum line height h in pixels or other suitable units of measurement. For example, T may be the average height of the line block in a particular region of the document. Next, machine-encoded representations of the textual content identified in all of the bounding boxes are stored 410 in a vector that defines various lines in the document. The vector of lines is referred to as (Lv). Any number of existing conversion methods can be used to convert the textual content into machine-encoded text, such as optical character recognition or an image-to-PDF conversion process or an image-to-MS-WORD® conversion process, for instance.

Figure 5:
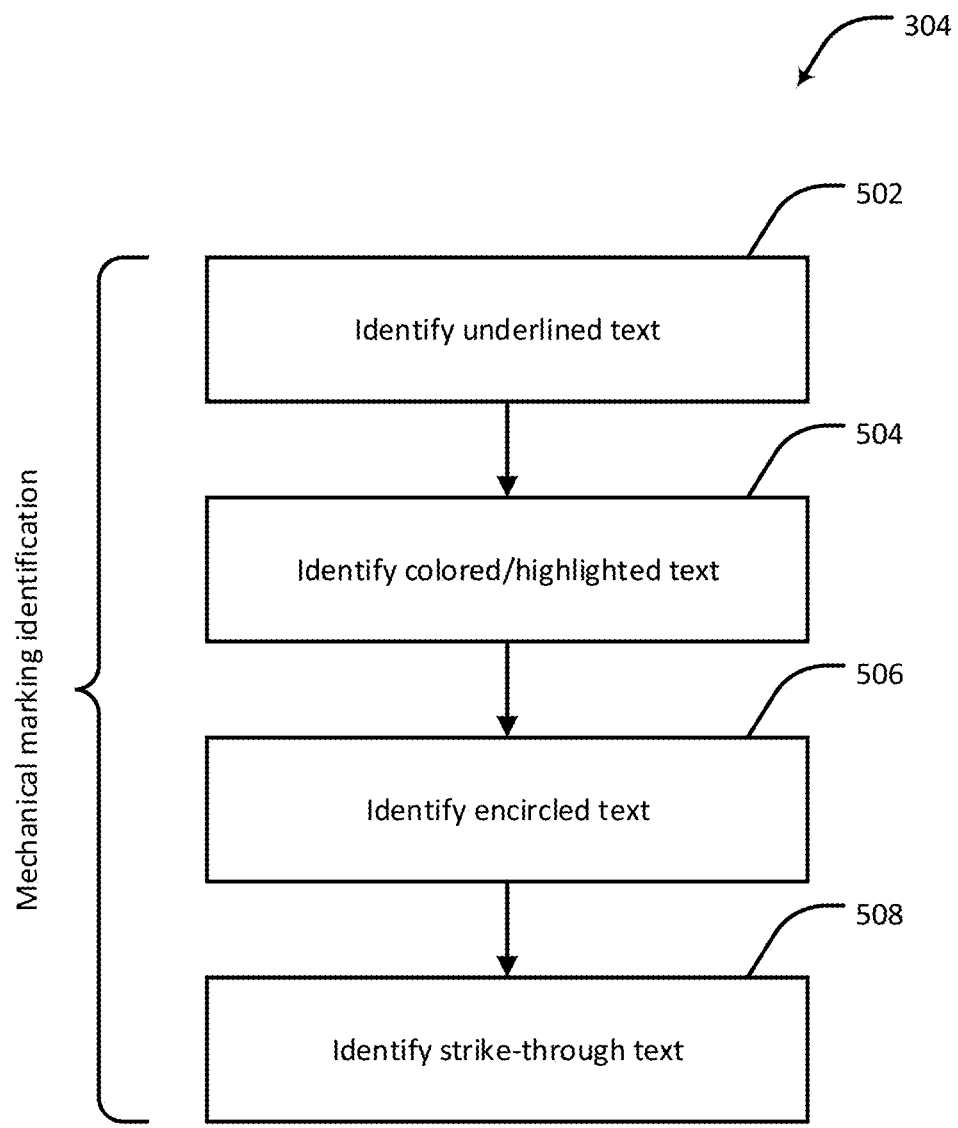
FIG. 5 is a flow diagram of an example methodology for identifying one or more mechanical markings associated with each identified block of text in an image of a hardcopy document, in accordance with an embodiment of the present disclosure.

FIG. 5 is a flow diagram of an example methodology 304 for identifying 304 one or more mechanical markings associated with each identified text block, in accordance with an embodiment of the present disclosure. As noted above, a given text block may have text that is underlined, colored/highlighted, encircled, stricken-through, or any combination of such markings. The bounding boxes stored 410 in the vector Lv, such as described above, can be used to identify 304 any of the mechanical markings in the hardcopy document image 140. For example, mechanical markings in the hardcopy document image 140 that are within the bounding boxes may be associated with the text block corresponding to the bounding box. The methodology 304 includes identifying 502 underlined text, identifying 504 colored/highlighted text, identifying 506 encircled text, identifying 508 strike-through text, or any combination of these acts. Further details for each of these acts are described below.

Figure 6:
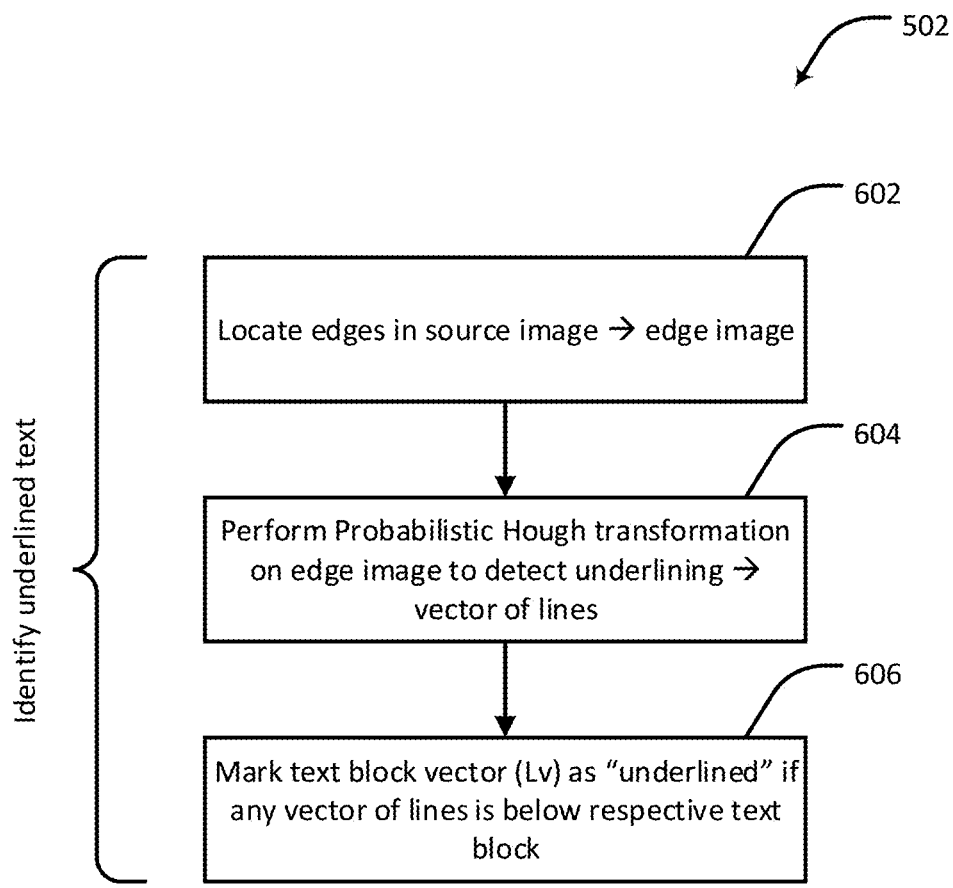
FIG. 6 is a flow diagram of an example methodology for identifying underlined text in one or more blocks of text in an image of a hardcopy document and translating that underlining to a corresponding machine-encoded document file, in accordance with an embodiment of the present disclosure.

FIG. 6 is a flow diagram of an example methodology 502 for identifying underlined text in one or more text blocks, in accordance with an embodiment of the present disclosure. The methodology 502 includes locating 602 one or more edges in the source image (e.g., the hardcopy document image 140) to produce an edge image. For this, edges are found using a modified canny edge detector to provide a black and white image with lines and points representing the edges. Adaptive hysteresis localization and thresholding is performed so that noise in the image will not create false edges, and so that marked edges are as close as possible to the edge in the real image.

Next, the methodology 502 includes performing 604 a Probabilistic Hough transformation on the edge image to detect underlining, which produces a vector of lines. The probabilistic Hough transform yields fewer line segments but with higher accuracy than the standard Hough transform. The Probabilistic Hough transform avoids conducting the computationally expensive voting process for every non-zero pixel in the image by taking advantage of the geometric properties of analytical curves, and thus improves the time efficiency and reduces the storage requirement of the original algorithm. In the Probabilistic Hough transform algorithm used above, a two-dimensional array is used, called an accumulator, to detect the existence of a line described by r=x cos(θ)+y sin(θ). Next, the accumulator is searched for all lines given a certain threshold. The dimension of the accumulator equals the number of unknown parameters, i.e., two, considering quantized values of r and θ in the pair (r,θ). For each pixel at (x,y) and its neighborhood, the Probabilistic Hough transform algorithm determines if there is enough evidence of a straight line at that pixel. If so, the parameters (r,θ) of that line are calculated, and the corresponding bin value of the accumulator in incremented.

At this point, a vector of lines is generated. If any of these lines lie between the vectors of textual lines Vector (Lv) generated in textual block localization, then that line is marked 606 as "underlined." Here, if the start and end coordinates of the line lie between the bottom of one bounding box and top of another bounding box, then the vector associated with the top bounding box is marked as "underline."

Figure 7:
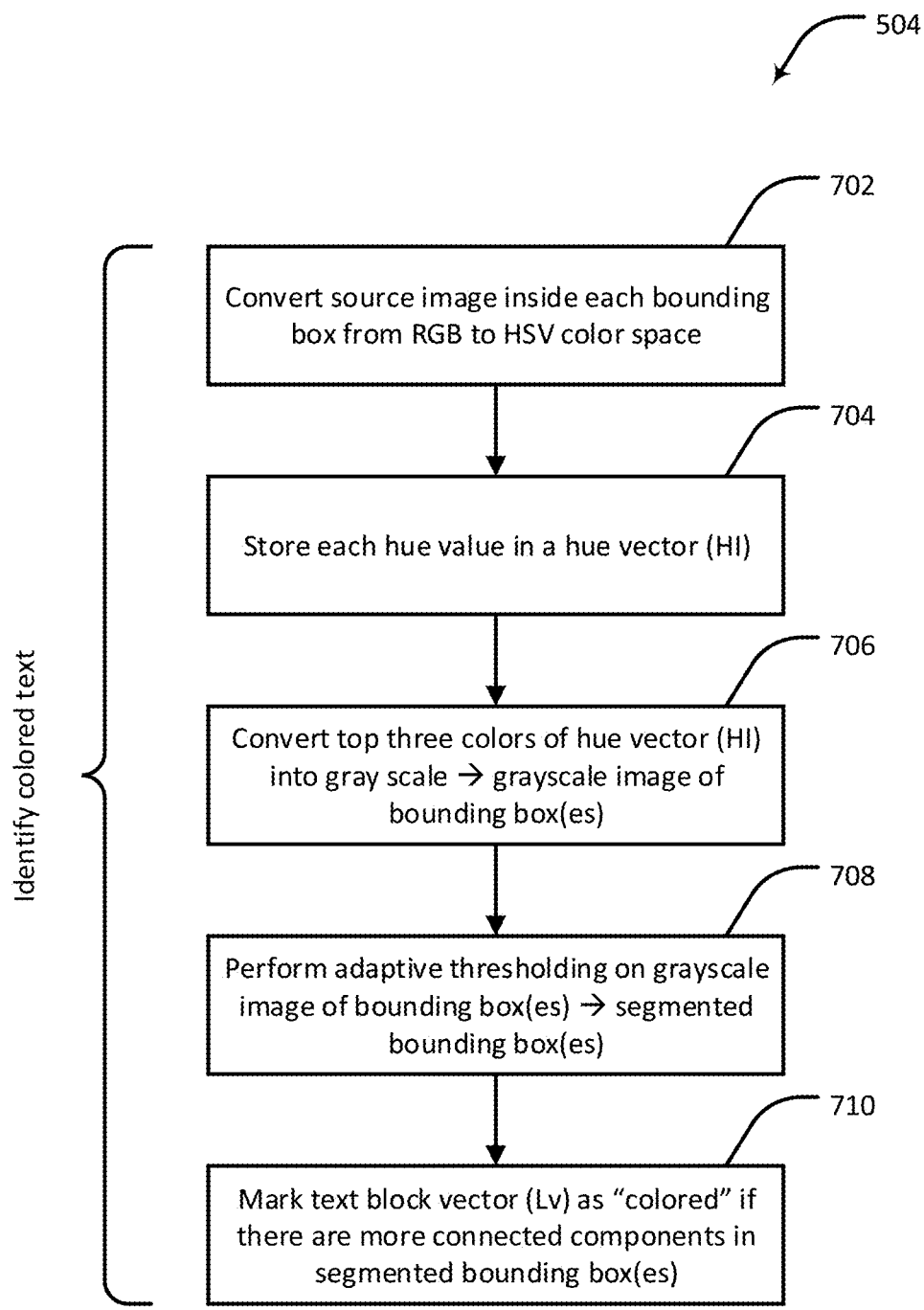
FIG. 7 is a flow diagram of an example methodology for identifying colored/highlighted text in one or more blocks of text in an image of a hardcopy document and translating that colored/highlighted text to a corresponding machine-encoded document file, in accordance with an embodiment of the present disclosure.

FIG. 7 is a flow diagram of an example methodology 504 for identifying colored/highlighted text in one or more text blocks, in accordance with an embodiment of the present disclosure. For each bounding box (i) in the vector (Lv), the following acts are performed to identify if the line is marked with colored or highlighted text. The methodology 504 includes converting 702 the source image inside each bounding box from RGB to HSV color space so that different hue values can be determined. Each of the hue values are stored 704 in a vector (HI). If there are not more than two colors that occupy a majority of the space in the content inside the bounding box (for example, the only colors are black text and white background), then the corresponding text line is marked as non-colored. Otherwise, the top three colors of the vector (HI) are converted 706 into gray scale, and adaptive thresholding is performed on the gray scale image of the bounding box (i) to produce a segmented bounding box. If the textual line is colored by the user, then more connected components are obtained in the image when it is thresholded with a different, lighter color. For example, if more than one-half of the color in the segmented bounding box is different than the text (font) color, then the text may be colored/highlighted. In this case, the line is marked 710 as colored text.

Figure 8:
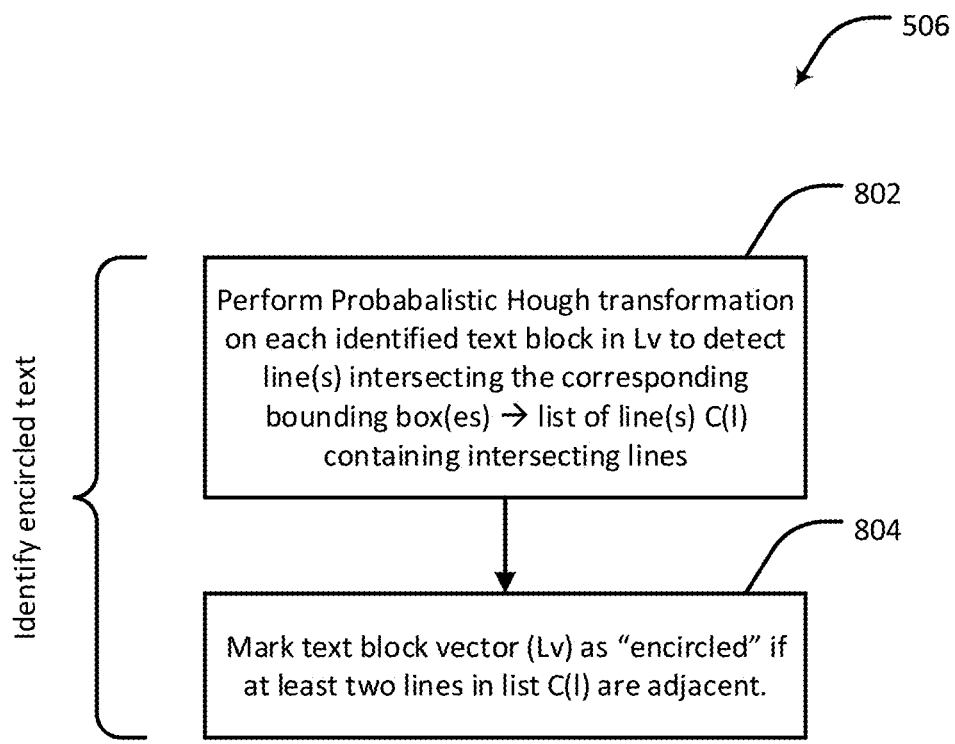
FIG. 8 is a flow diagram of an example methodology for identifying encircled text in one or more blocks of text in an image of a hardcopy document and translating that encircled text to a corresponding machine-encoded document file, in accordance with an embodiment of the present disclosure.

FIG. 8 is a flow diagram of an example methodology 506 for identifying encircled text in one or more text blocks, in accordance with an embodiment of the present disclosure. For each textual line vector (Lv) generated above, the following acts are performed. The bounding box for line (i) in (Lv) is referred to as B(i). For this block, a Hough transform is performed 802 to find lines (if any) as explained above with respect to underlined text (FIG. 6). If there are any lines found intersecting the bounding box B(i), then that line is added to List C(l). Once this process is complete for all the lines (i) in (Lv), lines in the List C(1) are considered adjacent based on the ending coordinates of one line and starting coordinates of another line. If more than threshold T lines get connected to each other, then this combination of adjacent lines is marked 804 as encircled text.

Figure 9:
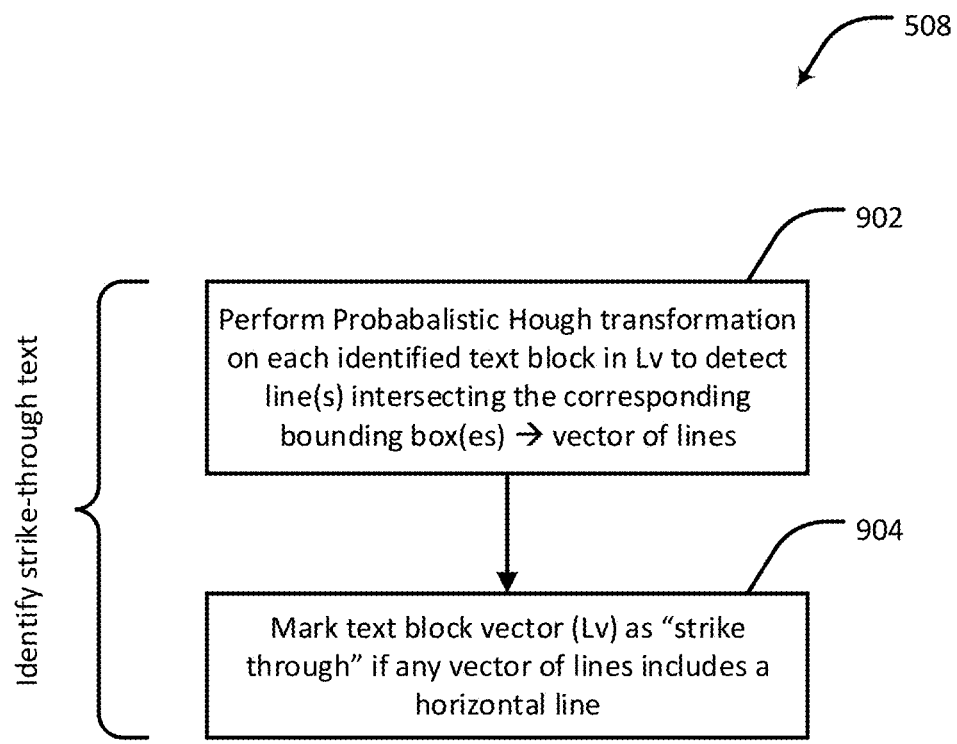
FIG. 9 is a flow diagram of an example methodology for identifying strike-through text in one or more blocks of text in an image of a hardcopy document and translating that strike-through text to a corresponding machine-encoded document file, in accordance with an embodiment of the present disclosure.

FIG. 9 is a flow diagram of an example methodology 508 for identifying strike-through text in one or more text blocks, in accordance with an embodiment of the present disclosure. For each textual line vector (Lv) generated above, the following acts are performed. The bounding box for line (i) in (Lv) is referred to as B(i). For this block, a Hough transform is performed 902 to find lines (if any) as explained above with respect to underlined text (FIG. 6). Lines of text that are approximately horizontal can be identified by checking the starting and ending Y coordinates. If the difference between these two coordinates is less than a delta (e.g., 5 pixels), the text line is marked 904 as strikethrough line.

Figure 10:
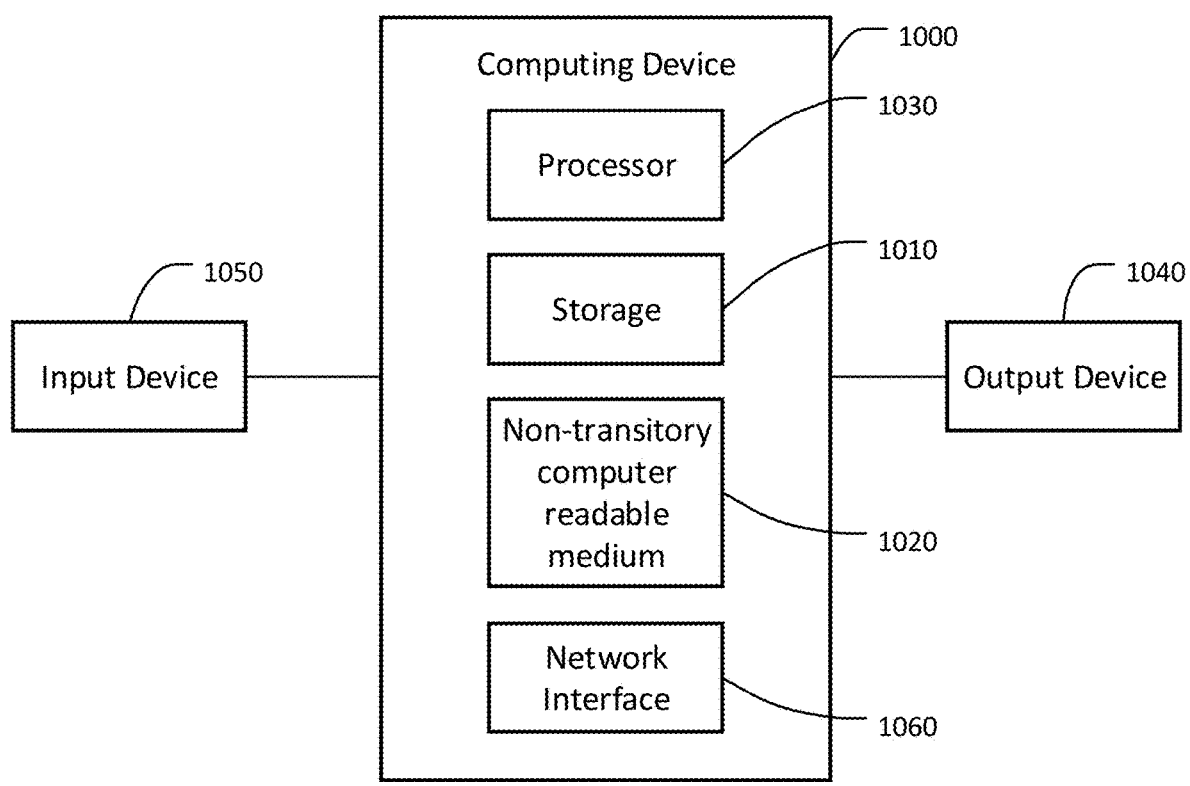
FIG. 10 is a block diagram representing an example computing device that may be used to perform any of the techniques as variously described in this disclosure.

FIG. 10 is a block diagram representing an example computing device 1000 that may be used to perform any of the techniques as variously described in this disclosure. For example, the system 100 of FIG. 1, or any portions thereof, and the methodologies of FIGS. 3-9, or any portions thereof, may be implemented in the computing device 1000. The computing device 1000 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 1000 includes one or more storage devices 1010 or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements or information or data associated with some embodiments. The computing device 1000 may include other I/O devices 1050 for receiving input from a user, for example, a keyboard, a joystick, a game controller, a pointing device (e.g., a mouse, a user's finger interfacing directly with a touch-sensitive display device, etc.), or any suitable user interface. The computing device 1000 may include other suitable conventional I/O peripherals. The computing device 1000 includes or is operatively coupled to various suitable devices for performing one or more of the aspects as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the digitizing application 130, the GUI 160, or any combination of these, is implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 1000, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of converting mechanical markings on hardcopy textual content to digital annotations in a digital document file. The method includes identifying at least one block of text in a digital image of a hardcopy document; identifying at least one mechanical marking in the digital image of the hardcopy document, in which the at least one mechanical marking covers or lies adjacent to the at least one block of text; and generating a machine-encoded annotated digital document file from the digital image of the hardcopy document, where the annotated digital document file includes computer-executable instructions representing at least one annotation corresponding to the at least one mechanical marking identified in the digital image of the hardcopy document. In some cases, identifying the at least one block of text in the digital image of the hardcopy document applying a Gaussian blur to the digital image of the hardcopy document to produce a blurred image of the at least one block of text; performing adaptive thresholding on the blurred image to produce a segmented image of the at least one block of text; applying a dilation operator to the segmented image to produce a morphed image of the at least one block of text; and generating at least one bounding box surrounding one or more words in the morphed image of the at least one block of text. In some such cases, identifying the at least one block of text in the digital image of the hardcopy document further includes converting textual content identified in the at least one bounding box into representative code, storing the representative code of the at least one bounding box in a text block vector usable to produce the digital document file, or both, where the method further includes modifying the representative code to include the computer-executable instructions representing the at least one annotation corresponding to the at least one mechanical marking identified in the digital image of the hardcopy document. In some cases, identifying at least one mechanical marking in the digital image of the hardcopy document includes a step for identifying underlined text; a step for identifying colored/highlighted text; a step for identifying encircled text; a step for identifying strike-through text, or any combination of these steps. In some cases, identifying at least one mechanical marking in the digital image of the hardcopy document includes identifying underlined text by locating one or more edges of the digital image of the hardcopy document to produce an edge image; performing a Probabilistic Hough transformation on the edge image to produce a vector of lines; marking the at least one block of text as underlined based on the vector of lines; and converting the at least one block of text, with underlining, to machine-encoded text. In some cases, identifying at least one mechanical marking in the digital image of the hardcopy document comprises identifying colored/highlighted text by converting at least a portion of the digital image of the hardcopy document containing the at least one block of text into a HSV (Hue, Saturation, Value) color space value; storing the HSV color space value in a hue vector; converting the HSV color space value into grayscale to produce a grayscale image of the converted portion of the digital image; performing adaptive thresholding on the grayscale image to produce a segmented grayscale image; marking the at least one block of text as colored based on the segmented grayscale image; and converting the at least one block of text, with coloring, to machine-encoded text. In some cases, identifying at least one mechanical marking in the digital image of the hardcopy document includes identifying encircled text by performing a Probabilistic Hough transformation on the at least one text block to produce a list of intersecting lines; marking the at least one block of text as encircled based on the list of intersecting lines; and converting the at least one block of text, with encircling, to machine-encoded text. In some cases, identifying at least one mechanical marking in the digital image of the hardcopy document includes identifying strike-through text by performing a Probabilistic Hough transformation on the at least one text block to produce a vector of lines; marking the at least one block of text as strike-through based on the vector of lines; and converting the at least one block of text, with strike-through, to machine-encoded text. In some cases, the annotated digital document is compliant with a Portable Document Format (PDF) standard.

Another example embodiment provides a system for converting mechanical markings on hardcopy textual content to digital annotations in a digital document file. The system includes a storage and a processor operatively coupled to the storage, where the processor is configured to execute instructions stored in the storage that when executed cause the processor to carry out a process including identifying at least one block of text in a digital image of a hardcopy document; identifying at least one mechanical marking in the digital image of the hardcopy document, in which the at least one mechanical marking covers or lies adjacent to the at least one block of text; and generating a machine-encoded annotated digital document file from the digital image of the hardcopy document, where the annotated digital document file includes code representing at least one annotation corresponding to the at least one mechanical marking identified in the digital image of the hardcopy document. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of converting mechanical markings on hardcopy textual content to digital annotations in a digital document file, the method comprising:
   identifying at least one block of text in a digital image of a hardcopy document;
   converting textual content identified in the at least one block of text into machine-encoded text;
   storing the machine-encoded text in a text block vector representing one line of text in the digital image of the hardcopy document;
   identifying a type of at least one mechanical marking in the digital image of the hardcopy document, wherein the at least one mechanical marking covers or lies adjacent to the at least one block of text;
   generating a machine-encoded annotated digital document file from the text block vector, the annotated digital document file being different from the digital image of the hardcopy document; and
   modifying the text block vector in the annotated digital document file by marking the text block vector as the type of the at least one mechanical marking identified in the digital image of the hardcopy document, wherein the annotated digital document file includes the text block vector marked with computer-executable instructions representing at least one annotation corresponding to the at least one mechanical marking.

2. The method of claim 1, wherein identifying the at least one block of text in the digital image of the hardcopy document comprises:
   applying a Gaussian blur to the digital image of the hardcopy document to produce a blurred image of the at least one block of text;
   performing adaptive thresholding on the blurred image to produce a segmented image of the at least one block of text;
   applying a dilation operator to the segmented image to produce a morphed image of the at least one block of text; and
   generating at least one bounding box surrounding one or more words in the morphed image of the at least one block of text.

3. The method of claim 1, further comprising modifying the text block vector to include the computer-executable instructions representing the at least one annotation corresponding to the at least one mechanical marking identified in the digital image of the hardcopy document.

4. The method of claim 1, wherein the type of the at least one mechanical marking is underlined text, colored/highlighted text, encircled text, or struckthrough text, and wherein identifying the type of the at least one mechanical marking in the digital image of the hardcopy document comprises:
   a step for identifying the underlined text;
   a step for identifying the colored/highlighted text;
   a step for identifying the encircled text; or
   a step for identifying the struckthrough text.

5. The method of claim 1, wherein identifying the type of the at least one mechanical marking in the digital image of the hardcopy document comprises identifying the underlined text by locating one or more edges of the digital image of the hardcopy document to produce an edge image;
   performing a Probabilistic Hough transformation on the edge image to produce a vector of lines;
   marking the at least one block of text as underlined based on the vector of lines; and
   converting the at least one block of text, with underlining, to machine-encoded text.

6. The method of claim 1, wherein identifying the type of the at least one mechanical marking in the digital image of the hardcopy document comprises identifying the colored/highlighted text by converting at least a portion of the digital image of the hardcopy document containing the at least one block of text into a HSV (Hue, Saturation, Value) color space value;
   storing the HSV color space value in a hue vector;
   converting the HSV color space value into grayscale to produce a grayscale image of the converted portion of the digital image;
   performing adaptive thresholding on the grayscale image to produce a segmented grayscale image;
   marking the at least one block of text as colored based on the segmented grayscale image; and
   converting the at least one block of text, with coloring, to machine-encoded text.

7. The method of claim 1, wherein identifying the type of the at least one mechanical marking in the digital image of the hardcopy document comprises identifying the encircled text by
   performing a Probabilistic Hough transformation on the at least one text block to produce a list of intersecting lines;
   marking the at least one block of text as encircled based on the list of intersecting lines; and converting the at least one block of text, with encircling, to machine-encoded text.

8. The method of claim 1, wherein identifying the type of the at least one mechanical marking in the digital image of the hardcopy document comprises identifying the struckthrough text by
performing a Probabilistic Hough transformation on the at least one text block to produce a vector of lines;
marking the at least one block of text as struckthrough based on the vector of lines; and
converting the at least one block of text, with strikethrough, to machine-encoded text.

9. The method of claim 1, wherein the annotated digital document is compliant with a Portable Document Format (PDF) standard.

10. A non-transitory computer readable medium having instructions encoded thereon that when executed by one or more computer processors cause the one or more computer processors to perform a process comprising:
identifying at least one block of text in a digital image of a hardcopy document;
storing machine-encoded text, representing the at least one block of text, in a text block vector representing one line of text in the digital image of the hardcopy document;
identifying a type of at least one mechanical marking in the digital image of the hardcopy document, in which the at least one mechanical marking covers or lies adjacent to the at least one block of text;
generating a machine-encoded annotated digital document file from the text block vector, the annotated digital document file being different from the digital image of the hardcopy document; and
modifying the text block vector in the annotated digital document file by marking the text block vector as the type of the at least one mechanical marking identified in the digital image of the hardcopy document, wherein the annotated digital document file includes the text block vector marked with computer-executable instructions representing at least one annotation corresponding to the at least one mechanical marking.

11. The non-transitory computer readable medium of claim 10, wherein identifying the at least one block of text in the digital image of the hardcopy document comprises:
applying a Gaussian blur to the digital image of the hardcopy document to produce a blurred image of the at least one block of text;
performing adaptive thresholding on the blurred image to produce a segmented image of the at least one block of text;
applying a dilation operator to the segmented image to produce a morphed image of the at least one block of text; and
generating at least one bounding box surrounding one or more words in the morphed image of the at least one block of text.

12. The non-transitory computer readable medium of claim 11, further comprising modifying the text block vector to include the computer-executable instructions representing the at least one annotation corresponding to the at least one mechanical marking identified in the digital image of the hardcopy document.

13. The non-transitory computer readable medium of claim 10, wherein the type of the at least one mechanical marking is underlined text, colored/highlighted text, encircled text, or struckthrough text, and wherein identifying the type of the at least one mechanical marking in the digital image of the hardcopy document comprises:
step for identifying the underlined text;
step for identifying the colored/highlighted text;
step for identifying the encircled text; or
step for identifying the struckthrough text.

14. The non-transitory computer readable medium of claim 10, wherein identifying the type of the at least one mechanical marking in the digital image of the hardcopy document comprises identifying the underlined text by
locating one or more edges of the digital image of the hardcopy document to produce an edge image;
performing a Probabilistic Hough transformation on the edge image to produce a vector of lines;
marking the at least one block of text as underlined based on the vector of lines; and
converting the at least one block of text, with underlining, to machine-encoded text.

15. The non-transitory computer readable medium of claim 10, wherein identifying the type of the at least one mechanical marking in the digital image of the hardcopy document comprises identifying the colored/highlighted text by
converting at least a portion of the digital image of the hardcopy document containing the at least one block of text into a HSV (Hue, Saturation, Value) color space value;
storing the HSV color space value in a hue vector;
converting the HSV color space value into grayscale to produce a grayscale image of the converted portion of the digital image;
performing adaptive thresholding on the grayscale image to produce a segmented grayscale image;
marking the at least one block of text as colored based on the segmented grayscale image; and
converting the at least one block of text, with coloring, to machine-encoded text.

16. The non-transitory computer readable medium of claim 10, wherein identifying the type of the at least one mechanical marking in the digital image of the hardcopy document comprises identifying the encircled text by performing a Probabilistic Hough transformation on the at least one text block to produce a list of intersecting lines;
marking the at least one block of text as encircled based on the list of intersecting lines; and
converting the at least one block of text, with encircling, to machine-encoded text.

17. The non-transitory computer readable medium of claim 10, wherein identifying the type of the at least one mechanical marking in the digital image of the hardcopy document comprises identifying the struckthrough text by
performing a Probabilistic Hough transformation on the at least one text block to produce a vector of lines;
marking the at least one block of text as struckthrough based on the vector of lines; and
converting the at least one block of text, with strikethrough, to machine-encoded text.

18. The non-transitory computer readable medium of claim 10, wherein the annotated digital document is compliant with a Portable Document Format (PDF) standard.

19. A system for converting mechanical markings on hardcopy textual content to digital annotations in a digital document file, the system comprising:
a storage; and a processor operatively coupled to the storage, the processor configured to execute instructions stored in the storage that when executed cause the processor to carry out a process including
 identifying at least one block of text in a digital image of a hardcopy document
 storing machine-encoded text, representing at least one line of text in a digital image of a hardcopy document, in a text block vector;
 identifying a type of at least one mechanical marking in the digital image of the hardcopy document, in which the at least one mechanical marking covers or lies adjacent to the at least one block of text;
 generating a machine-encoded annotated digital document file from text block vector, the annotated digital document file being different from the digital image of the hardcopy document; and
 modifying the text block vector in the annotated digital document file by marking the text block vector as the type of the at least one mechanical marking identified in the digital image of the hardcopy document, wherein the annotated digital document file includes the text block vector marked with computer-executable instructions representing at least one annotation corresponding to the at least one mechanical marking.

20. The system of claim 19, wherein the type of the at least one mechanical marking is underlined text, colored/highlighted text, encircled text, or struckthrough text, and wherein identifying the type of the at least one mechanical marking in the digital image of the hardcopy document comprises:
 identifying the underlined text by
  locating one or more edges of the digital image of the hardcopy document to produce an edge image,
  performing a Probabilistic Hough transformation on the edge image to produce a vector of lines,
  marking the at least one block of text as underlined based on the vector of lines, and
  converting the at least one block of text, with underlining, to machine-encoded text;
 identifying the colored/highlighted text by
  converting at least a portion of the digital image of the hardcopy document containing the at least one block of text into a HSV (Hue, Saturation, Value) color space value,
  storing the HSV color space value in a hue vector,
  converting the HSV color space value into grayscale to produce a grayscale image of the converted portion of the digital image,
  performing adaptive thresholding on the grayscale image to produce a segmented grayscale image,
  marking the at least one block of text as colored based on the segmented grayscale image, and
  converting the at least one block of text, with coloring, to machine-encoded text;
 identifying the encircled text by
  performing a Probabilistic Hough transformation on the at least one text block to produce a list of intersecting lines,
  marking the at least one block of text as encircled based on the list of intersecting lines, and
  converting the at least one block of text, with encircling, to machine-encoded text; and
 identifying the struckthrough text by
  performing a Probabilistic Hough transformation on the at least one text block to produce a vector of lines,
  marking the at least one block of text as struckthrough based on the vector of lines, and
  converting the at least one block of text, with strikethrough, to machine-encoded text.

* * * * *